United States Patent [19]
Hyson

[11] 3,909,236
[45] Sept. 30, 1975

[54] LIQUID URACIL CONCENTRATES

[75] Inventor: Archibald Miller Hyson, Newark, Del.

[73] Assignee: E. I. Du Pont de Nemours and Company, Wilmington, Del.

[22] Filed: Oct. 11, 1973

[21] Appl. No.: 405,546

Related U.S. Application Data

[63] Continuation-in-part of Ser. No. 244,874, April 17, 1972, abandoned, which is a continuation-in-part of Ser. No. 614,817, Feb. 9, 1967, abandoned.

[52] U.S. Cl. .................................. 71/92; 71/DIG. 1
[51] Int. Cl.² .......................................... A01N 9/22
[58] Field of Search ........................... 71/92, DIG. 1

[56] References Cited
UNITED STATES PATENTS

| | | | |
|---|---|---|---|
| 2,510,839 | 6/1950 | Shmidl | 71/DIG. 1 |
| 3,235,357 | 2/1966 | Loux | 71/92 |
| 3,291,592 | 12/1966 | Evans | 71/92 |
| 3,399,991 | 9/1968 | Littler | 71/120 |
| 3,764,293 | 10/1973 | Guth | 71/DIG. 1 |

FOREIGN PATENTS OR APPLICATIONS

| | | | |
|---|---|---|---|
| 707,272 | 4/1965 | Canada | 71/92 |

*Primary Examiner*—James O. Thomas, Jr.

[57] ABSTRACT

Liquid, water-soluble concentrates of certain herbicidal uracils, containing 20–40% by weight of lithium salts of such uracils dissolved in a solvent system composed of 50–80% by weight of a glycol medium and 20–50% by weight of water.

12 Claims, No Drawings

LIQUID URACIL CONCENTRATES

CROSS REFERENCE TO RELATED APPLICATION

This application is a continuation-in-part of my application Ser. No. 244,874, filed Apr. 17, 1972, now abandoned, which was a continuation-in-part of my application Ser. No. 614,817, filed Feb. 9, 1967, now abandoned.

BACKGROUND OF THE INVENTION

This invention relates to novel herbicidal compositions and more particularly to liquid, water-soluble concentrates of three herbicidal 3,5,6-substituted uracils.

These uracils and their herbicidal activity have been disclosed in U.S. Pat. No. 3,235,357.

It is desirable from a user's standpoint that liquid concentrates of herbicidal uracils be available for use. Liquid concentrates of herbicides are convenient to handle and lend themselves for direct spray application in low-volume applications. They also are easier to dilute to spray volume as compared to conventional solid formulations. For example, liquid concentrates can be pumped; and even when used in small amounts, liquids can be more conveniently and accurately measured than solids. A further advantage of water-soluble liquid concentrates is that they can be diluted to spray volume and yield a true solution which does not require agitation, as distinguished from slurries made up with wettable powders, finely ground liquid suspensions or emulsifiable concentrates.

SUMMARY OF THE INVENTION

According to this invention, it has been found that the lithium salts of three herbicidal uracils have a surprisingly high solubility in a glycol medium and that the resulting solutions have excellent storage stability. A glycol medium is defined for the purpose of this invention as ethylene glycol, or combinations of ethylene glycol with methanol, ethanol, or methanol-ethanol mixture, with water, the weight proportion of the glycol or glycol-plus-alcohol being 50–80%, and the weight proportion of water being 20–50%. The alcohols can comprise from 0–20% of the glycol medium, with the proviso that not more than 10% of the glycol medium be methanol.

The three uracils suitable in the practice of this invention are represented by the following Formula (1)

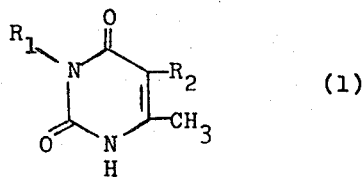

where
when $R_1$ is sec-butyl, $R_2$ is bromine or chlorine;
when $R_1$ is tert-butyl, $R_2$ is chlorine.

The concentrates of the invention are stable against crystallization at lower temperatures and contain 20–40 weight percent of one or more of the lithium salts, thus providing a practical herbicidal concentrate. The remainder of the concentrate is a glycol medium, which may also contain other additives. The concentrates can be further diluted to use level with water to form spraying compositions.

DETAILED DESCRIPTION OF THE INVENTION

The uracils contemplated by the present invention are 3-tert-butyl-5-chloro-6-methyluracil, 3-sec-butyl-5-chloro-6-methyluracil, and 3-sec-butyl-5-bromo-6-methyluracil. The concentrates containing lithium salts of the above uracils can be diluted with water to spray levels without precipitation.

The uracils of the above Formula (1) can be prepared by several methods well known in the art. In this respect, the preparation disclosure of U.S. Pat. No. 3,235,357 is incorporated herein by reference.

The lithium salts of the uracils are prepared by conventional methods such as dissolving the free uracil in an aqueous solution of at least an equimolar amount of a base or basic salt containing the lithium cation. For example, the lithium salt can be prepared by dissolving the uracil in water containing at least an equimolar amount of lithium hydroxide. The salt can then be isolated from the solution by the removal of the water. In some instances, it may be advantageous to use a slight excess of lithium hydroxide.

Further, the lithium salt can be prepared in situ during the process of making the concentrates of this invention, for instance, by first adding lithium hydroxide to the glycol medium and then adding the uracil and mixing until it is dissolved. The glycol which is suitable in the practice of the present invention is ethylene glycol and the alcohols are methanol and ethanol.

Anti-foam agents which are soluble in the concentrate can also be added. Thus, acetylenic glycols and long chain alcohols containing at least 6 carbon atoms can be used at concentrations up to 1%. The anti-foam agents are very useful in preventing foaming during spray applications.

As previously set forth, the herbicidal uracil lithium salt may be incorporated into the solvent system as such to give the concentrate of the invention, or the salt can be formed in situ by the reaction of the uracil with lithium hydroxide. In either case, it is sometimes convenient to have a small excess of free lithium hydroxide present and this will remain in the concentrate.

Thus, the concentrates of this invention can contain, on weight basis, from 20 to 40% of the lithium salt of the uracil, from 0 to 1% of anti-foam agent, from 0 to 3% of lithium hydroxide, and from 56 to 80% of the glycol medium proper.

Preferred concentrates consist of 20 to 35% of the lithium salt of the uracil, from 0.1 to 1% of lithium hydroxide, and from 64 to 79.9% of the glycol medium as defined above.

It is well understood, of course, that two or more of the above uracil lithium salts can be present in the same solution; and in such a case, the expression "the concentration of the uracil salt" will be construed to mean the total concentration of all such salts present.

The concentrates of the invention retain the same herbicidal activity as the parent uracil. Thus the concentrates can be diluted with water to spray volume and applied as taught in U.S. Pat. No. 3,235,357. When applied at equivalent uracil concentration, equivalent results will be obtained. Thus, broadly speaking, the active ingredient would normally be used at levels of ¼ kg./hectare to about 25 kg./hectare.

Certain preferred embodiments of this invention are now illustrated by the following, representative examples, wherein all parts, proportions, and percentages are by weight unless indicated otherwise.

EXAMPLE 1

| | Percent |
|---|---|
| 3-tert-Butyl-5-chloro-6-methyl-uracil, lithium salt | 20.0 |
| Ethanol | 6.7 |
| Methanol | 3.3 |
| Water | 34.7 |
| Ethylene glycol | 35.0 |
| Lithium hydroxide, monohydrate | 0.2 |
| Isooctyl alcohol | 0.1 |

The above components are mixed and stirred until a homogeneous solution results. The solution is chemically stable for long periods at temperatures up to 45°C and physically stable down to −6°C. The concentrate is diluted to spray concentration with water and is applied to a roadside at a rate of 17 kg./hectare. Excellent initial kill of foliage and residual weed control is obtained.

The other two uracils of this invention can be formulated and applied in like manner.

EXAMPLE 2

| | Percent |
|---|---|
| 5-Bromo-3-sec-butyl-6-methyl-uracil | 30.0 |
| Lithium hydroxide, monohydrate | 6.0 |
| Ethylene glycol | 43.0 |
| Water | 21.0 |

The above components are mixed and stirred until a homogeneous solution results. The solution is chemically stable for long periods at temperatures up to 45°C. and physically stable at temperatures down to −6°C.

EXAMPLE 3

| | Percent |
|---|---|
| 3-sec-Butyl-5-chloro-6-methyluracil | 24.0 |
| Ethylene glycol | 36.8 |
| Ethyl alcohol | 6.7 |
| Methyl alcohol | 3.3 |
| Water | 24.0 |
| Lithium hydroxide, monohydrate | 5.2 |

The above components are mixed and stirred until a homogeneous solution results. The solution is chemically stable for long periods at temperatures up to 45°C. and physically stable at temperatures down to −6°C.

EXAMPLE 4

| | Percent |
|---|---|
| 5-Bromo-3-sec-butyl-6-methyl-uracil | 22.7 |
| Lithium hydroxide, monohydrate | 3.9 |
| Ethyl alcohol | 6.1 |
| Methyl alcohol | 3.9 |
| Ethylene glycol | 31.7 |
| Water | 31.7 |

The above components are mixed and stirred until a homogeneous solution results. This solution is chemically stable for long periods at temperatures up to 45°C. and physically stable at temperatures down to −17°C.

EXAMPLE 5

| | Percent |
|---|---|
| 5-Bromo-3-sec-butyl-6-methyl-uracil, Li salt trihydrate | 35.0 |
| Ethylene glycol | 49.5 |
| Water | 15.0 |
| Lithium hydroxide, monohydrate | 0.5 |

The above components are mixed and stirred until a homogeneous solution results. This solution is chemically stable for long periods at temperatures up to 45°C. and physically stable at temperatures down to −6°C.

Ten liters of this formulation are mixed in 100 liters of water and sprayed in the springtime inside the fenced enclosure of a power transformer substation, an area 80 meters by 40 meters, to maintain the soil surface free of weeds such as broomsedge (*Andropogon virginicus*), beggarticks (Bidens spp.), vasey grass (*Paspalum urvillei*), Johnsongrass (*Sorghum holepeuse*), morningglory (Impomoca spp.), and ragweed (Ambrosia spp.).

EXAMPLE 6

| | Percent |
|---|---|
| 5-Bromo-3-sec-butyl-6-methyl-uracil | 23.0 |
| Ethylene glycol | 53.0 |
| Water | 20.0 |
| Lithium hydroxide, monohydrate | 4.0 |

The above components are mixed and stirred until a homogeneous solution results. The above solution is chemically stable for long periods at temperatures up to 45°C and physically stable at temperatures down to −17°C.

One part by volume of this solution is mixed with 10 parts of water and sprayed between the rails and 3 meters to either side of the mainline tracks at a volume rate of 500 liters per kilometer to maintain the ballast free of all vegetation.

EXAMPLE 7

| | Percent |
|---|---|
| 5-Bromo-3-sec-butyl-6-methyl-uracil | 20.0 |
| Lithium hydroxide, monohydrate | 3.9 |
| Ethylene glycol | 30.0 |
| Water | 36.1 |
| Ethanol | 6.1 |
| Methanol | 3.9 |

The above ingredients are mixed and stirred until a homogeneous solution results. The solution is chemically stable for long periods at temperatures up to 45°C. and physically stable down to −6°C.

Twenty kilograms of the above formulation are mixed in 500 liters of water and sprayed on the equivalent of one hectare under highway guardrails and at the base of highway regulatory signs to control all vegetation for a season.

EXAMPLE 8

|  | Percent |
| --- | --- |
| 3-tert-Butyl-5-chloro-6-methyl-uracil | 20.0 |
| Lithium hydroxide, monohydrate | 4.2 |
| Ethylene glycol | 44.0 |
| Water | 21.8 |
| Ethanol | 6.1 |
| Methanol | 3.9 |

The above ingredients are mixed and stirred until a homogeneous solution results. This solution is chemically stable for long periods at temperatures up to 45°C. and physically stable down to 0°C.

Fifteen kilograms of this formulation are mixed in 400 liters of water and sprayed broadcast on a hectare of Leon fine sandy soil planted to orange trees to control such troublesome weeds as Bermudagrass (*Cynodon doctylon*), bahia grass (*Paspalium notatum*) and other troublesome weeds.

EXAMPLE 9

|  | Percent |
| --- | --- |
| 3-tert-Butyl-5-chloro-6-methyl-uracil | 20.0 |
| Ethylene glycol | 40.0 |
| Water | 25.0 |
| Ethanol | 6.1 |
| Methanol | 3.9 |
| Lithium hydroxide, monohydrate | 5.0 |

The above ingredients are mixed and stirred until a homogeneous solution results.

Fifteen liters of the above solution are mixed with 400 liters of water and sprayed on a hectare of sugarcane immediately after shaving and off-barring to control such troublesome weeds as Bermudagrass, Johnsongrass seedlings, and morningglory. The sugarcane grows vigorously and produces a good yield of sugar.

In the following claims, the expression "consisting essentially of" means that in addition to the recited components the composition may also contain other components which do not adversely affect the effectiveness of the composition for the intended use.

I claim:

1. A liquid, water-soluble, herbicidal concentrate consisting essentially of a. about 20–40 weight percent of one or more lithium salts of any of the following uracils:
3-tert-butyl-5-chloro-6-methyluracil,
3-sec-butyl-5-chloro-6-methyluracil, and
3-sec-butyl-5-bromo-6-methyluracil; and b. 60–80 weight percent of a glycol medium, wherein 30–80 weight percent is ethylene glycol, 0–20 weight percent is methanol, ethanol, or methanol-ethanol mixture, with the proviso that not more than 10% of the glycol medium be methanol, and 20–50 weight percent is water.

2. A liquid concentrate of claim 1 consisting essentially of:

a. 20–40 weight percent of one or more lithium salts of the uracils recited in claim 1;

b. 0–1 weight percent of an antifoam agent;

c. 0–3 weight percent of lithium hydroxide; and d. 56–80 weight percent of a glycol medium, as recited in claim 1.

3. A liquid concentrate of claim 1 consisting essentially of a. 20–35 weight percent of one or more uracil salts recited in claim 1;

b. 0.1–1 weight percent of lithium hydroxide; and c. 64–79.9 weight percent of a glycol medium wherein 30–80 weight percent is ethylene glycol, 0–20 weight percent is methanol, ethanol, or methanol-ethanol mixture, with the proviso that not more than 10% of the glycol medium be methanol, and 20–50 weight percent is water.

4. The concentrate of claim 1 wherein the lithium salt is the salt of 3-tert-butyl-5-chloro-6-methyluracil.

5. The concentrate of claim 1 wherein the lithium salt is the salt of 5-bromo-3-sec-butyl-6-methyluracil.

6. The concentrate of claim 1 wherein the lithium salt is the salt of 3-sec-butyl-5-chloro-6-methyluracil.

7. The concentrate of claim 2 wherein the lithium salt is the salt of 3-tert-butyl-5-chloro-6-methyluracil.

8. The concentrate of claim 2 wherein the lithium salt is the salt of 5-bromo-3-sec-butyl-6-methyluracil.

9. The concentrate of claim 2 wherein the lithium salt is the salt of 3-sec-butyl-5-chloro-6-methyluracil.

10. The concentrate of claim 3 wherein the lithium salt is the salt of 3-tert-butyl-5-chloro-6-methyluracil.

11. The concentrate of claim 3 wherein the lithium salt is the salt of 5-bromo-3-sec-butyl-6-methyluracil.

12. The concentrate of claim 3 wherein the lithium salt is the salt of 3-sec-butyl-5-chloro-6-methyluracil.

* * * * *